United States Patent [19]

Tajima

[11] Patent Number: 5,404,013
[45] Date of Patent: Apr. 4, 1995

[54] INFRARED IMAGING SYSTEM HAVING AN AUTOMATIC FOCUSING CONTROL

[75] Inventor: Masami Tajima, Kawasaki, Japan

[73] Assignee: Fujitsu Limited, Kawasaki, Japan

[21] Appl. No.: 120,273

[22] Filed: Sep. 10, 1993

[30] Foreign Application Priority Data

Feb. 25, 1993 [JP] Japan .................................. 5-036290

[51] Int. Cl.6 .................................................. G03B 3/00
[52] U.S. Cl. ................................ 250/332; 250/201.2; 250/201.4; 250/334; 250/347; 354/404
[58] Field of Search ................ 250/332, 334, 347, 348, 250/201.2, 201.4; 354/402, 403, 404, 406, 407

[56] References Cited

U.S. PATENT DOCUMENTS

| 4,672,439 | 6/1987 | Florence et al. | 250/332 |
|---|---|---|---|
| 4,696,558 | 9/1987 | Karasaki et al. | 354/406 |
| 4,835,561 | 5/1989 | Matsui | 354/403 |
| 5,140,416 | 8/1992 | Tinkler | 250/332 |
| 5,264,930 | 11/1993 | Florence et al. | 250/332 |

FOREIGN PATENT DOCUMENTS

| 56-147274 | 11/1981 | Japan . |
|---|---|---|
| 57-133413 | 8/1982 | Japan . |
| 58-58505 | 4/1983 | Japan . |
| 60-263584 | 12/1985 | Japan . |
| 62-166309 | 7/1987 | Japan . |
| 1-107224 | 4/1989 | Japan . |
| 1-285907 | 11/1989 | Japan . |
| 1-285908 | 11/1989 | Japan . |
| 3-256015 | 11/1991 | Japan . |
| 4-81729 | 3/1992 | Japan . |
| 4-158322 | 6/1992 | Japan . |

Primary Examiner—Constantine Hannaher

[57] ABSTRACT

An infrared imaging system comprises an optical system for forming an image of a target on an infrared detection array and an automatic focusing mechanism, wherein an output image signal of the infrared detection array is processed in a filter to extract high frequency components therefrom, The automatic focusing mechanism controls the optical system such that the high frequency components in the image signal is enhanced, In order to detect the maximum enhancement of the high frequency components, the high frequency components for the present moment and those for a past moment are compared while driving the automatic focusing mechanism, Further, the infrared imaging system is equipped with a predictive focusing control system that detects a moving speed of the target and activates the automatic focusing mechanism in advance when the moving speed of the target is fast.

18 Claims, 14 Drawing Sheets

F I G. 7
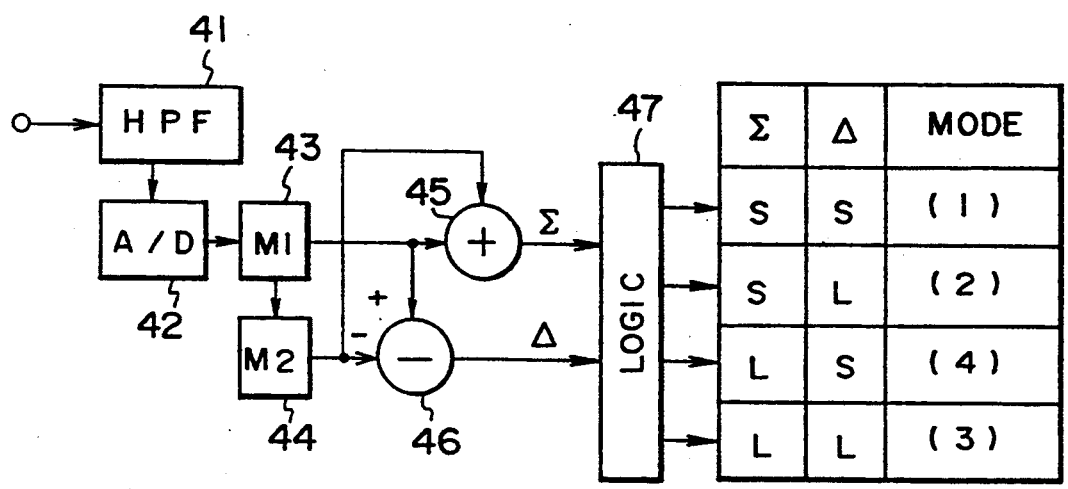

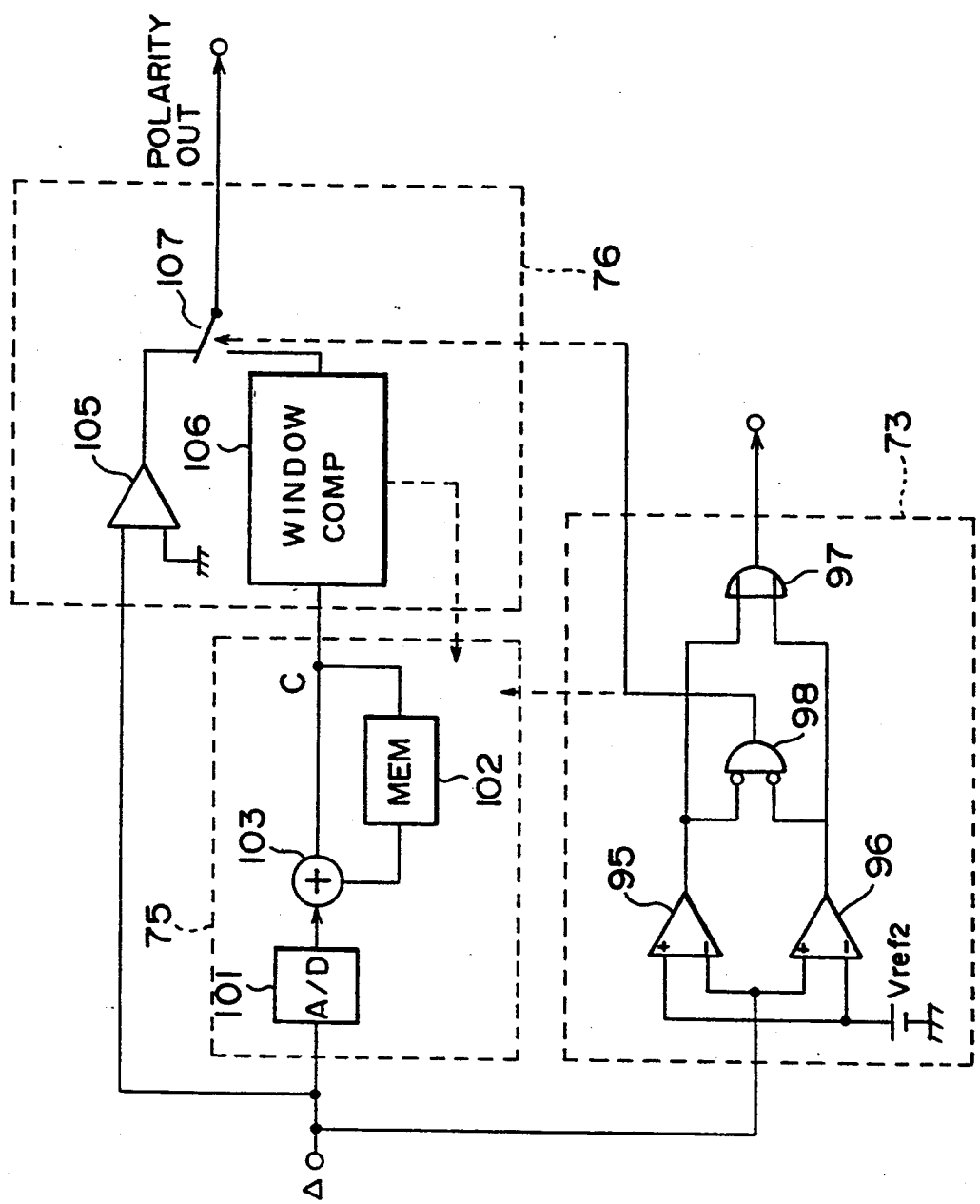
FIG. II

INFRARED IMAGING SYSTEM HAVING AN AUTOMATIC FOCUSING CONTROL

BACKGROUND OF THE INVENTION

The present invention generally relates to the technology for automatically focusing infrared cameras and more particularly to an automatic focusing system for an infrared camera wherein the focusing is achieved by an electronic circuit based upon an image signal produced by the camera, while maintaining a smooth driving operation of an optical system of the camera.

Infrared cameras produce a visual image of a target based upon a detection of infrared radiation from the target. Thus, infrared cameras are used extensively for civil as well as military purposes for measuring surface temperature distribution profiles of objects or detection of a high temperature target.

In such infrared cameras, it is necessary to provide an automatic focusing system such that an arbitrary target in the view field is kept properly focused even when the distance between the target and the camera has been changed. Generally, such an automatic adjustment of focusing is achieved by electronic means by changing a lens position, which is defined as a distance between a lens and the image plane of the optical system in the camera. During such an automatic focusing process, it is desired to change the lens position as smoothly as possible to avoid shock or excessive force to the driving mechanism that is used for driving the lens.

Thus, the present invention is primarily related to the improvement of infrared imaging systems by providing automatic focusing control means. However, the present invention is also useful generally in the sensor fusion technologies wherein various sensing means are integrated.

Conventionally, infrared cameras are provided with a fixed optical system wherein the focal point is fixed at an infinite distance. There are also some infrared cameras equipped with an optical system that allows manual, preset focusing adjustment. There are few infrared cameras, particularly those used in the thermal infrared band, that are equipped with an automatic focusing control system. The reason for this rather primitive state of infrared camera technology may be attributed to the fact that the infrared cameras for thermal infrared radiation require a mechanism for compensating for the temperature variation of the lens which may be caused by the infrared radiation. Provision of such a mechanism makes the structure of cameras substantially more complicated than other types of cameras designed for visible optical radiation.

Although there are a few infrared cameras that are equipped with an automatic focusing mechanism, such a mechanism generally uses an external range finder, such as an ultrasonic range finder, that detects the distance by a sensor. There are no infrared cameras that achieve automatic focusing adjustment based upon an image signal that is obtained by the camera itself.

In the television cameras for visible band images, a CCD array is commonly used, and automatic focusing is achieved based upon the output signal of the CCD array. Thereby, this automatic focusing mechanism generally achieves a focusing adjustment with respect to the object at the central part of the view field. However, it has not been possible to achieve focusing of the optical system with respect to any arbitrary object in the view field.

Thus, conventional infrared cameras, even if equipped with an automatic focusing system, can not achieve the focusing of any arbitrary target in the view field. In order to achieve proper focusing, therefore, it has been necessary to point the camera straight at the target such that the target is held at the center of the view field. However, there are cases where such a control of the camera in relation to the target is not always possible.

In another aspect of the state of the art technology of high sensitivity infrared imaging systems, it should be noted that the two-dimensional array of CCD elements, used conventionally in the visible band imaging systems, cannot be used for the image sensor unit. At present, it is necessary to use a one-dimensional array of infrared detection elements for the image sensor of the infrared camera. Thereby, an optical scanning system is provided which scans the infrared image with respect to the one-dimensional array in the direction perpendicular to the direction in which the one-dimensional sensor array extends. In such a construction, it should be noted that the output signals are produced from the one-dimensional array of infrared sensor elements with a timing that is substantially different from the timing of the output signals produced by the CCD array in the conventional television camera.

Further, in order to implement the automatic focusing adjustment by driving the lens system based upon only the electric signal, it is necessary to establish a control logic for controlling the rotational speed or direction of the motor that drives the lenses. Because of the fact that the hardware for the automatic focusing control system for the infrared cameras does not exist, there is no established logic for controlling such hardware.

In the situation wherein there is a movement of the target in the view field, the automatic focusing system of the infrared cameras has to be able to lock on the target such that the target is kept in focus while the target is moving. In such a dynamic focusing adjustment, it becomes difficult to keep the target properly focused particularly when the target is moving fast. In such a situation, therefore, it is necessary to predict the movement of the target such that the focusing is achieved at the predicted position of the target. Conventionally, there is no known procedure for achieving such a predictive focusing control in the art of infrared cameras.

SUMMARY OF THE INVENTION

Accordingly, it is a general object of the present invention to provide a novel and useful infrared camera wherein the foregoing problems are eliminated.

Another and more specific object of the present invention is to provide an infrared camera having a capability of performing an automatic focusing with respect to an arbitrary object in a view field of the camera.

Another object of the present invention is to provide an infrared camera that uses a one-dimensional array of infrared sensing elements, wherein the camera has a capability of performing an automatic focusing control based upon an output image signal produced by the foregoing one-dimensional array of infrared sensing elements.

Another object of the present invention is to provide an infrared camera having a capability of performing an automatic focusing control, wherein the automatic focusing control is achieved solely based upon an electric output produced by the camera by using a control logic that predicts the proper focusing control of a moving target.

Another object of the present invention is to provide an infrared imaging system comprising:

a lens system for focusing a two-dimensional infrared image of an object on an image plane of said lens system;

a lens drive mechanism carrying said lens system such that said lens system is movable along an optical axis of said lens system;

an infrared detection array comprising a plurality of infrared detection elements arranged on a plane, for producing output signals indicative of said two-dimensional image of said object;

display means supplied with said output signals from said infrared detection array for displaying an image of said object;

filtering means supplied with said output signals from said infrared detection array for extracting high spatial frequency components therefrom;

processing means supplied with an output of said filtering means indicative of said high spatial frequency components, said processing means evaluating a rate of change of said output of said filtering means with time and producing a control signal indicative of a focusing state of said infrared image on said infrared detection array, based upon said rate of change thus evaluated;

said processing means supplying said control signal to said lens drive mechanism for controlling the same such that said image plane coincides substantially with said plane of said infrared detection array;

said processing means comprising a first memory for storing said output signals of said filtering means corresponding to one horizontal scanning line that is included in said two-dimensional image for the present moment, a second memory for storing said output signals of said filtering means corresponding to said horizontal scanning line for a moment in the past, an adder for calculating a sum of a content of said first memory and a content of said second memory, a subtracter for calculating a difference between said content of said first memory and said content of said second memory, and a logic circuit supplied with an output of said adder and an output of said subtracter for producing said control signal indicative of said focusing state based upon a combination of said output of said adder and said output of said subtracter.

According to the present invention, one can achieve an automatic focusing control of the infrared camera based upon the image signal itself that is produced by the camera. The principle behind such an automatic focusing control is as follows. Generally, an optical beam focused on an image detection array such as the foregoing infrared detection array has a reduced spot size when the beam is properly focused, and the image thus formed has a sharp boundary. In response to the sharpness of the image, the output of the image detection array has an increased spatial resolution. This means that the transfer characteristic of the modulation transfer function (MTF) is enhanced for the high frequency components, reflecting the fact that the recognition of small objects becomes possible in the properly focused state. Thus, by detecting the state of the output signal of the image detection array with respect to the high frequency components, it is possible to detect the focusing state of the image on the image detection array. The present invention applies the foregoing principle particularly to an infrared camera designed for thermal infrared imaging, and determines the overall MTF that includes the term corresponding to the infrared optical system such as the lens, the infrared opto-electric conversion system such as the infrared detection array, and the electrical system such as amplifiers. In the state wherein the proper focusing is achieved, the image signal produced by the electrical system includes the high frequency components.

In order to detect the high frequency components included in the image signal produced by the camera, the present invention employs a high-pass filter having a transfer characteristic that increases gradually with frequency for enhancing the high frequency components, such a high-pass filter being used for extracting the high frequency component. In response to the detection of the high frequency components, the focusing mechanism that carries the lens system is driven until a proper focusing is achieved.

More specifically, the image signals of the current frame and the previous frame are added to each other as well as subtracted from each other to produce a sum signal and a difference signal respectively, and a control logic is employed for achieving the focusing control based upon the state of the sum signal and the difference signal thus obtained.

When performing the focusing control, it is important to avoid moving the motor too quickly to start, hold or reverse, in order to avoid a shock to the motor or to the optical system, which would prevent the desired smooth focusing from being achieved and would degrade the accuracy of the focusing. Further, such a control may cause a noise and shorten the lifetime of the camera. In particular, in the infrared cameras that use high speed motors for focusing control in particular, it is preferable to reduce the speed of the motor gradually with the proceeding of the focusing to facilitate the accurate control of the focusing. In the infrared cameras used for the objects that move fast, on the other hand, there may be a case wherein the driving of the focusing mechanism cannot follow the high speed movement of the object or target. In such a case, therefore, it is necessary to provide a control logic to predict the movement of the object such that the focusing is achieved at the predicted position of the object.

In order to meet the various requirements outlined above, the infrared camera of the present invention, achieves the focusing control with respect to an arbitrary object in the view field with a predictive control logic that controls the focusing mechanism at three or four distinct control speeds. In such a procedure, the control speed is selected from these three or four control speeds based upon the focusing state to avoid excessive stress upon the focusing mechanism. As a result of the predictive control logic, it is possible to keep the objects properly focused even when the object is moving fast.

Other objects and further features of the present invention will become apparent from the following detailed description of the preferred embodiments of the present invention when read in conjunction with the attached drawings.

BRIEF DESCRIPTION OF THE DRAWINGS

FIG. 7 is a block diagram showing the construction of the circuit used for detecting the focusing state of the infrared imaging system;

FIG. 11 is a circuit diagram showing another part of the imaging system of FIG. 8;

FIG. 13(A) shows the relationship between an additional signal and a motor rotation obtained in the operation of the system of FIG. 8;

FIG. 13(B) shows a quantized logic signal corresponding to the additional signal shown in FIG. 13(A);

FIG. 13(C) shows a difference signal $\Delta$;

FIG. 13(D) shows a quantized logic signal corresponding to the difference signal $\Delta$ of FIG. 13(C);

FIG. 13(E) shows the combination of additional and difference signals;

FIG. 13(F) shows a signal indicative of a mode represented by the combination of the additional signal and the difference signal $\Delta$;

DETAILED DESCRIPTION OF THE PREFERRED EMBODIMENTS

Figure 1:
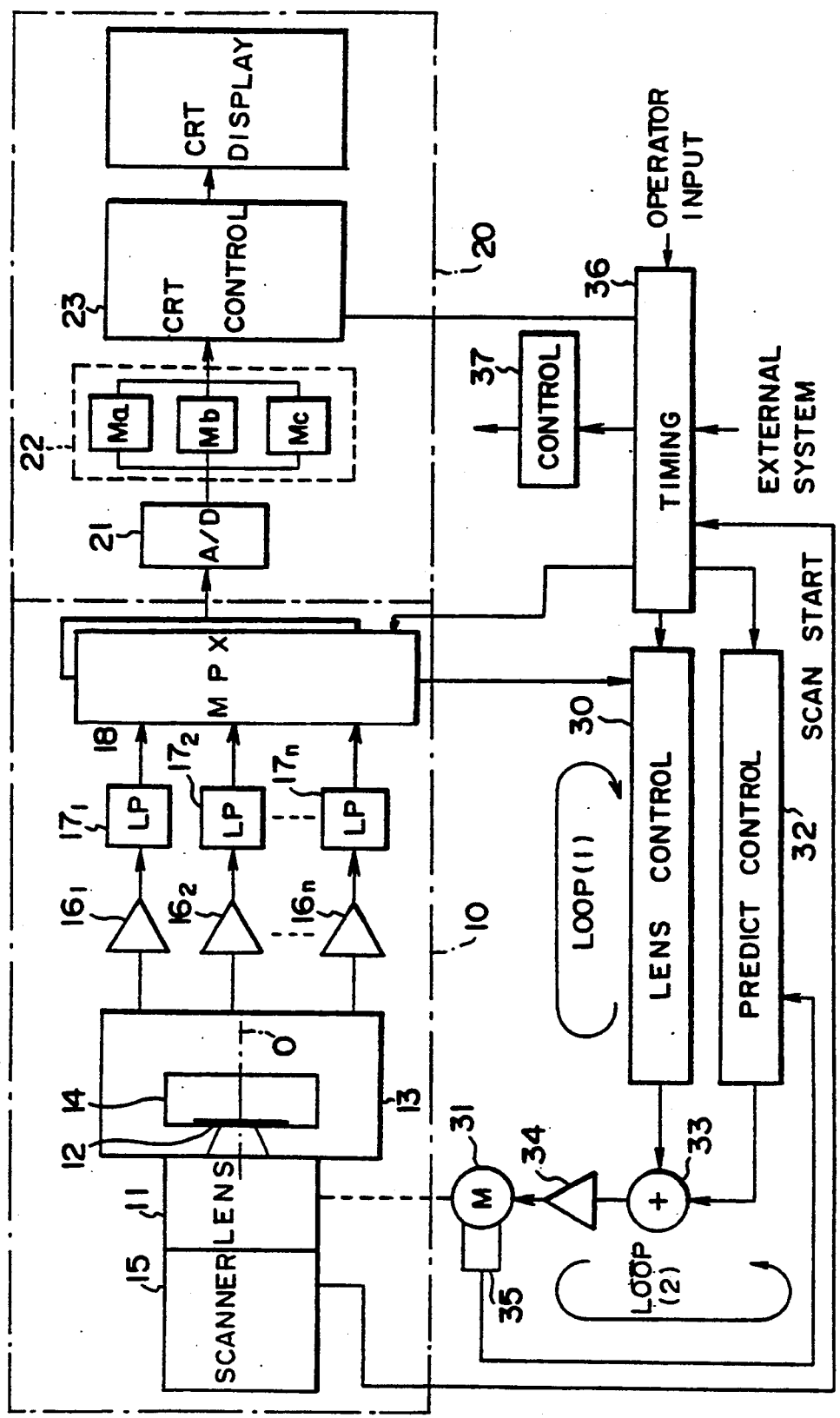
FIG. 1 is a block diagram showing the overall construction of the infrared imaging system according to an embodiment of the present invention.

FIG. 1 is a block diagram showing the overall construction of the infrared imaging system according to an embodiment of the present invention.

Referring to FIG. 1, the infrared imaging system includes an infrared camera unit 10 and an image conversion unit 20, wherein the camera unit 10 includes a lens system 11 for focusing a two-dimensional real image of an object or a target on an image plane 12. The lens system 11 has an optical axis O and focuses the infrared beam about the optical axis O as usual in the art. The lens system 11 is held to be movable in the direction of the optical axis O by a focusing control motor 31 to be described later, such that the distance between the lens system 11 and the image plane 12 changes in response to the driving of the motor 31. In correspondence to the image plane 12, there is provided an infrared detection unit 13 for converting the infrared image formed at the image plane 12 to an electrical signal, wherein the infrared detection unit 13 includes a detection element array 14 that in turn includes a plurality of infrared detection elements aligned to form a one-dimensional row. By selecting detection elements in the array 14, in an order from one end to the other end of the array, it is possible to achieve a vertical scanning of the image formed on the infrared detection unit 13.

In order to enable the detection of the two-dimensional infrared image, the camera of FIG. 1 includes an optical scanning mechanism 15 that is provided in the optical path of the incoming infrared beam. The scanning mechanism 15 includes a scanning mirror not illustrated, wherein the mirror is provided in alignment to the optical axis O and is swung or rotated to deflect the incoming infrared beam in a direction perpendicular to the one-dimensional array 14 of the infrared detection unit 13.

The output image signals produced by the detection elements in the array 14 are supplied to corresponding video amplifiers $16_1$, $16_2$, ... $16_n$ for amplification thereof. After being amplified in the video amplifiers, the image signals are supplied to corresponding low pass filters $17_1$, $17_2$, ... $17_n$ to cut off the noise components from the image signals. The image signals thus processed are then supplied to a multiplexer 18 that produces a single output signal by applying a time-division multiplexing process to the incoming input image signals.

The output of the multiplexer 18 is supplied to an A/D converter 21 that forms a part of the foregoing conversion unit 20, to convert the output to a digital signal. The output digital signal of the A/D converter 21 is then supplied to a memory unit 22 that includes image memories Ma, Mb and Mc, wherein the image memory Ma stores the two-dimensional image for one frame of a picture that includes pixels for one horizontal scanning achieved by the scanning mechanism 15 for each vertical scanning of the element array 14. Each frame includes first and second fields, as is commonly known in the art of interlace scanning, and the contents of the memory Ma for odd scanning lines are transferred to the image memory Mb while the contents of the memory Ma for even scanning lines are transferred to the memory Mc. The scanning to form the foregoing two-dimensional image is achieved at a relatively slow speed of the order of several Herz to several tens of Herz.

The two-dimensional images thus obtained are read out from the image memories Mb and Mc alternately at a high speed and displayed on a cathode ray tube 24 under control of a controller 23 while being simultaneously written the images into the image memory Ma. As a result, a visual image of the target is displayed on the cathode ray tube 24.

The infrared imaging system of FIG. 1 further includes a lens drive controller 30 that controls the movement of the lens system 11 in the direction of the optical axis O, by energizing the motor 31 described briefly before in response to the output of the multiplexer 18. Further, there is provided a predictive control system 32 that drives the motor 31 in those cases where the movement of the target is too fast for the controller 30 to achieve the proper focusing control. The predictive control system 32 moves the lens system 11 to a predicted position by driving the motor 31 in advance, based upon the positional information of the lens system 11 for the past and for the present. The output of the controller 30 and the output of the controller 32 are synthesized in a synthesis unit 33, the unit 33 producing a control output that drives the motor 31. The output of the synthesis; unit 33 is then supplied to the motor 31 after amplification in a power amplifier 34. It should be noted that the motor 31 is provided with an encoder 35 that outputs the foregoing positional information of the lens system based upon the rotational angle of the drive motor 31.

In order to control the overall operation of the foregoing various parts of the infrared imaging system, there is provided a timing generator 36 that produces various timing signals based upon a scanning status signal supplied from the scanning mechanism 15 as a reference timing signal. The timing generator 36 produces, for example, a timing signal for controlling the controller 30 or the predictive control system 32, based upon a command signal, given externally or given by an operator, for identifying the object displayed on the cathode ray tube 24 concerning which the focusing should be achieved. Further, the timing generator 36 produces a timing signal for controlling the multiplexer 18. Further, the timing generator 36 controls various parts in the camera unit 10 and the conversion unit 20 via a controller 37.

In the infrared imaging system of FIG. 1, the infrared camera unit 10 and the conversion unit 20 have a construction substantially the same as those of corresponding units in the conventional infrared imaging systems. However, the system of the present invention includes, in addition, a control loop (1) controlled by the lens drive controller 30 and a control loop (2) that is controlled by the predictive control system 32.

Figure 2A:
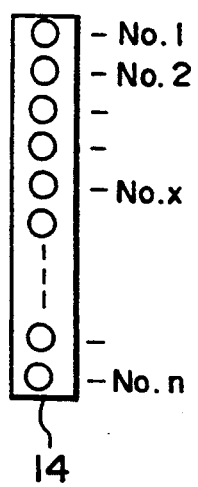
FIG. 2(A) shows an infrared detection array formed in a one-dimensional row.
Figure 2B:
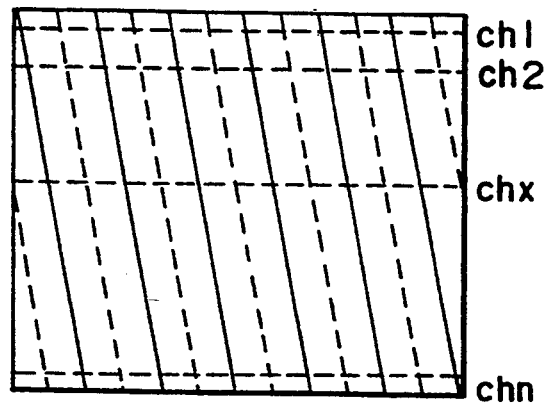
FIG. 2(B) shows writing of the infrared image into a memory unit of the system of FIG. 1.
Figure 2C:
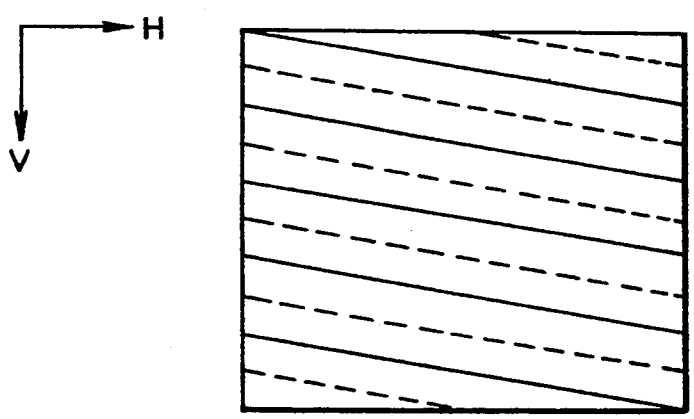
FIG. 2(C) shows reading of the image from the memory unit of the imaging system of FIG. 1.

FIGS. 2(A)–2(C) show the reading and writing of the image achieved in the infrared imaging system of the present invention to and from the memory unit 22, wherein FIG. 2(A) shows the infrared detection array 14, in detail and FIG. 2(B) shows the writing of the infrared image into the memory unit 22, while FIG. 2(C) shows the reading of the image from the memory unit 22.

As noted previously, the infrared imaging system of FIG. 1 uses the infrared detection array 14 in which the detection elements are arranged to form a one-dimensional row as indicated in FIG. 2(A). Typically, about 180 elements are included in the array 14, and a plurality of channels $ch_1$–$ch_n$ are formed in correspondence to the n elements in the array 14. Thus, the multiplexer 18 synthesizes the output image signals of the channels $ch_1$–$ch_n$ to produce a serial image signal on which the image signals of the individual elements are multiplexed according to the time-division multiplex procedure. Further, while the element array 14 is being scanned repeatedly in the vertical direction, the optical axis of the lens system 11 is deflected from the left to the right by activating the scanning mechanism 15. Thereby, the mechanical scanning is performed twice for each frame to achieve a 2:1 interlace scanning, and the image signal obtained as a result of such an interlace scanning is stored in the three memories Ma, Mb and Mc forming the memory unit 22 consecutively and repeatedly as indicated by the continuous lines that represent the even number scanning lines and the broken lines that represent the odd number scanning lines.

When images are being read from the memory unit 22, the contents of two of the memories, such as Mb and Mc, are read out alternately as indicated in FIG. 2(C) by the continuous lines representing the even number scanning lines and the broken lines representing the odd number scanning lines, in a way similar to a conventional scanning process employed in television systems. As a result, a visual image of the infrared target is represented on the cathode ray tube display 24.

In the foregoing process, it should be noted that the direction of scanning of the image memory at the time of writing is 90° different from that at the time of reading. The writing of the image is achieved at a relatively slow speed, while the reading of the image is achieved at a high speed.

The control loop (1) shown in FIG. 1 represents the normal automatic focusing control. Hereinafter, the operation of the control loop (1) will be described.

The camera unit 10, which has a well known construction, achieves the focusing control by moving the lens system 11 by the drive motor 31. The control of the drive motor 31 by which the focusing adjustment is performed is as follows.

When performing a focusing control in cameras by moving the lens system, it should be noted that the image on the image detection array 14 is blurred as regards those targets located at a finite distance from the lens when the lens position is set to focus a light beam coming in from an infinite distance. When the light beam is properly focused, the image of the target has a sharp boundary. In the state where the light beam is not properly focused, therefore, the beam spot of the light formed on the surface of the image detection array 14 has a size larger than the beam spot formed when the light beam is properly focused. In such a state where the light beam is not properly focused, the spatial resolution at the image surface is decreased and the output of the image detection array 14 lacks high frequency components. When the light beam is properly focused, on the other hand, the output of the array 14 contains a substantial amount of high frequency components in correspondence to the reduced beam spot size.

Figure 3:
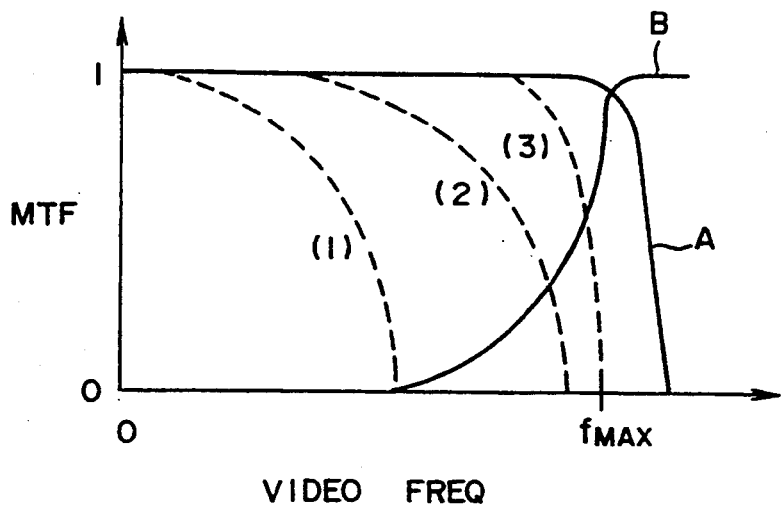
FIG. 3 is a diagram showing the filtering characteristics and the signal frequency component in the infrared imaging system of FIG. 1.

FIG. 3 shows the relationship between the filter characteristics and the signal frequency component, wherein the horizontal axis represents the video frequency while the vertical axis represents the magnitude of the transfer function. In FIG. 3, the curve designated as A represents the transfer characteristics of a low pass filter for cutting off noises, while the curve designated as B represents the transfer characteristics of a high pass filter for extracting the high frequency signal components from the image signal. It should be noted that the low pass filter has a steep cutoff characteristic at a cutoff frequency $f_{max}$ for cutting off the unwanted high frequency components originating from noise. On the other hand, the high pass filter has a characteristic that enhances the high frequency components gradually with frequency.

FIG. 3 further shows the energy distribution of the image signal supplied to the low pass filter by broken lines (1), (2) and (3), wherein it will be noted that the proportion of the high frequency components in the signal increases in the order of line (1), line (2) and line (3), in correspondence to the progress made in the focusing adjustment. It should be noted that the filter characteristic A and the filter characteristic B represent the MTF with respect to the image signal, and the output voltage of the low pass filter, represented as a convolution of the image signal energy and the MTF, increases in the order of line (1), line (2) and line (3), in correspondence to the progress made in the focusing adjustment.

When the target has moved and thus the relative distance to the camera unit 10 has been changed, the target is no longer in focus and the proportion of the high frequency component in the image signal decreases gradually. In correspondence to this, the energy of the output image signal for high frequency components decreases gradually. By providing the automatic focusing control, such a loss of focus is eliminated by adjusting the position of the lens system via a control system such that the proportion of the high frequency components in the image signal is maximized.

Figure 4A:
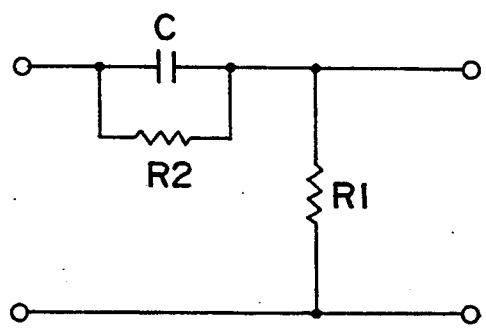
FIG. 4(A) shows an embodiment of a high-pass filter used in the system of FIG. 1.
Figure 4B:
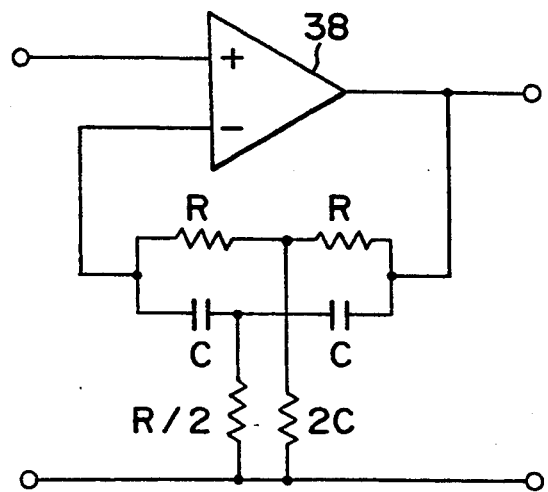
FIG. 4(B) shows another embodiment of a filter which is a band pass filter of a twin-T circuit employed in the system of FIG. 1.

In order to achieve such an automatic focusing control, the present invention extracts the high frequency components in the image signal by means of a high pass filter having a characteristic similar to the characteristic B. FIG. 4(A) shows a simple example of such a high pass filter while FIG. 4(B) shows a band pass filter of a twin-T circuit that may be employed also for the purpose of the present invention. In the drawings: the filters are formed of capacitors and resistors, wherein the filter of FIG. 4(B) includes an operational amplifier 38.

Figure 5A:
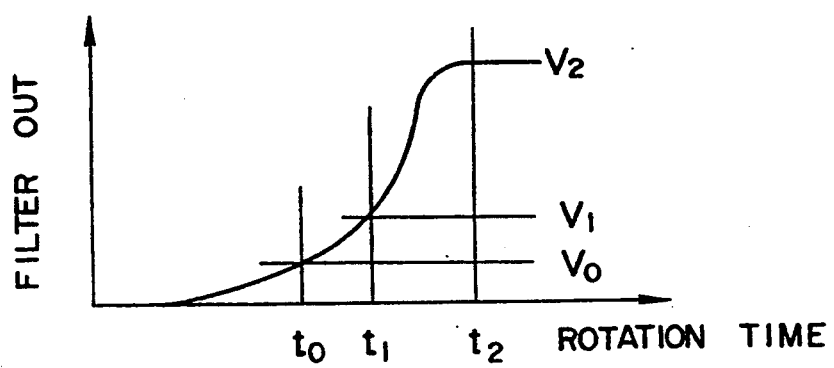
FIG. 5(A) is a diagram showing the relationship between the energization of the motor for focusing adjustment and the filter output where focusing is achieved gradually.
Figure 5B:
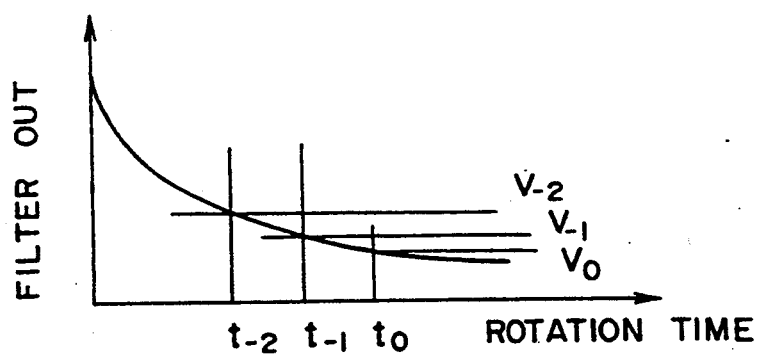
FIG. 5(B) is a diagram showing the relationship between the energization of the motor for focusing adjustment and the filter output where the deviation from the focusing state increases upon driving of the motor.
Figure 6:
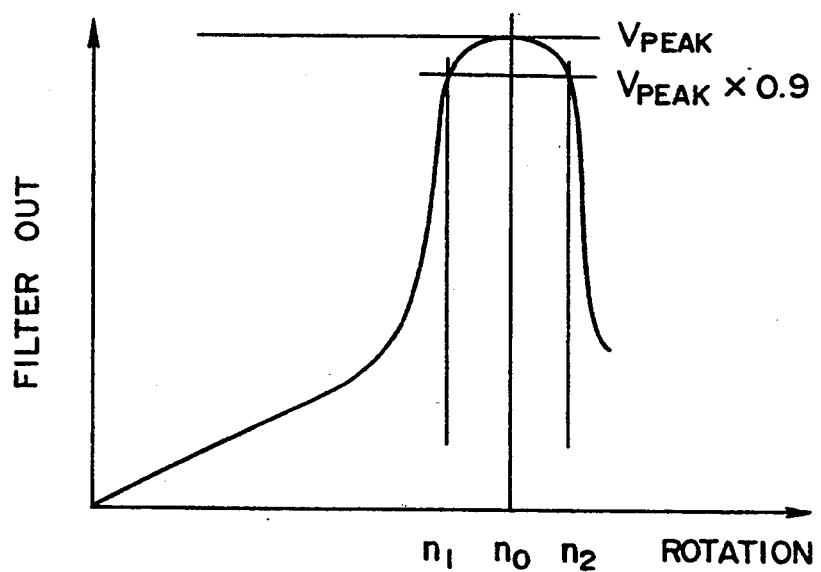
FIG. 6 is a diagram showing the rotation of the motor and the filter output.

FIGS. 5(A) and 5(B) as well as FIG. 6 show the change in the output of the high pass filter upon rotation of the drive motor 31 in the system of FIG. 1, wherein FIG. 5(A) and 5(B) show the output of the filter as a function of the driving interval of the motor 31.

It should be noted that FIG. 5(A) shows the case where the proper focusing is achieved gradually and progressively with the continuous driving of the motor while FIG. 5(B) shows the case wherein the direction in which the motor is driven is wrong and a deviation from the focusing state increases upon the driving of the motor. In FIG. 5(A), it will be noted that the output voltage of the filter increases in the order of $V_0, V_1, \ldots$ with passage of time $t_0, t_1, \ldots,$ until a saturation occurs at the time $t_2$ that corresponds to the state in which proper focusing is ultimately achieved.

In the case of FIG. 5(B) on the other hand, the motor is driven in the direction opposite to that in FIG. 5(A) and the output voltage of the high pass filter decreases with time as $V_{-2}, V_{-1}, V_0, \ldots$ with passage of time such in the order of $t_{-2}, t_{-1}, t_0, \ldots$ In the state of FIG. 5(B), proper focusing will never be achieved as long as the motor is driven continuously in the direction opposite to that in FIG. 5(A).

FIG. 6 shows the relationship between the rotational angle of the motor and the output of the high pass filter. It will be noted that the output of the high pass filter increases as the rotational angle of the motor increases until a rotational angle $n_0$ is reached, wherein the image output has a maximum value $V_{PEAK\ at\ n0}$. Upon further increase in the rotational angle of the motor, the output of the high pass filter starts to decrease. In FIG. 6, the range of the rotational angle of the motor that provides the output of the high pass filter exceeding a level of $0.9 \times V_{PEAK}$, is defined by $n_1$ and $n_2$. In the interval defined between $n_1$ and $n_2$, the driving speed of the motor 31 should be reduced to obtain accurate focusing control.

It should be noted that the detection of such an interval wherein the driving speed of the motor has to be reduced, can be achieved by periodically reading out the content of a memory M1 that stores therein the image output of the infrared camera for the present moment and the content of another memory M2 that stores the image output for a moment in the past. As a result of this, discrimination can be achieved by adding the contents of the memories M1 and M2 together as well as by subtracting the content of the memory M2 from the content of the memory M1. By controlling the driving of the motor 31 based upon the combination of the logic operation set forth above, one can achieve a proper adjustment of the focusing, wherein the direction of rotation of the motor may be reversed one or more times between the frames.

FIG. 7 shows the construction of a circuit that is used in the lens drive controller 30 of FIG. 1 for identifying the focusing status as well as a control logic that is employed in such a control operation.

Referring to FIG. 7, the circuit includes a high pass filter 41 for extracting the high frequency components from the image signal supplied from the multiplexer 18, the output voltage of the high pass filter 41 being supplied to a memory 43 after it is conversed to a digital signal in an A/D converter 42. It should be noted that the memory 43 corresponds to the foregoing memory M1 and stores the image signal of the present moment. Further, there is provided another memory 44 corresponding to the foregoing memory M2 that stores the image signal of a moment in the past. The contents of the memories 43 and 44 are supplied to a adder circuit 45 as well as to a subtracter circuit 46, wherein the circuit 45 calculates a sum $\Sigma$ of the contents of the memories 43 and 44. On the other hand, the subtracter circuit 46 subtracts the content of the memory 44 from the content of the memory 43 to obtain a difference $\Delta$. The sum $\Sigma$ and the difference $\Delta$ are supplied to a logic circuit 47 that achieves a logic operation for determining the status of focusing based upon the following two principles.

(a) The sum $\Sigma$ indicates whether the proper focusing is achieved or not.

(b) The difference $\Delta$ indicates whether or not the proper focusing is going to be achieved upon continuous driving of the motor.

As a result of the combination of the sum $\Sigma$ and the difference $\Delta$, one obtains four modes (1)–(4) indicated in FIG. 7, wherein the mode (1) corresponds to the state where the sum $\Sigma$ of the image signals is small and at the same time the difference $\Delta$ is small. In this state, focusing is entirely lost and it is thus necessary to drive the motor 31 at a high speed. The mode (2), on the other hand, corresponds to the case wherein the sum $\Sigma$ is small while the difference $\Delta$ has a large positive or negative value. When the difference is positive, this indicates that proper focusing is going to be rapidly achieved upon the driving of the 31 and that it is thus desirable to reduce the speed of the motor to an intermediate speed. When the difference Δ has a large negative value, on the other hand, this indicates that the lens system is moving rapidly in the direction in which focusing is lost and it is necessary to reverse the direction in which the motor 31 is driven and drive the same at an intermediate speed. In the mode (3) wherein the sum Σ is large and the difference Δ is also large, the lens system 11 is close to being in the proper focusing state and thus the motor 31 has to be driven at a slow speed to locate an exact focusing position. Further, in the mode (4) wherein the sum Σ is large while the difference Δ is small, the proper focusing is more or less achieved and thus the motor 31 should be stopped or driven at a very slow speed.

Figures 13A, 13B, 13C, 13D, 13E, 13F:
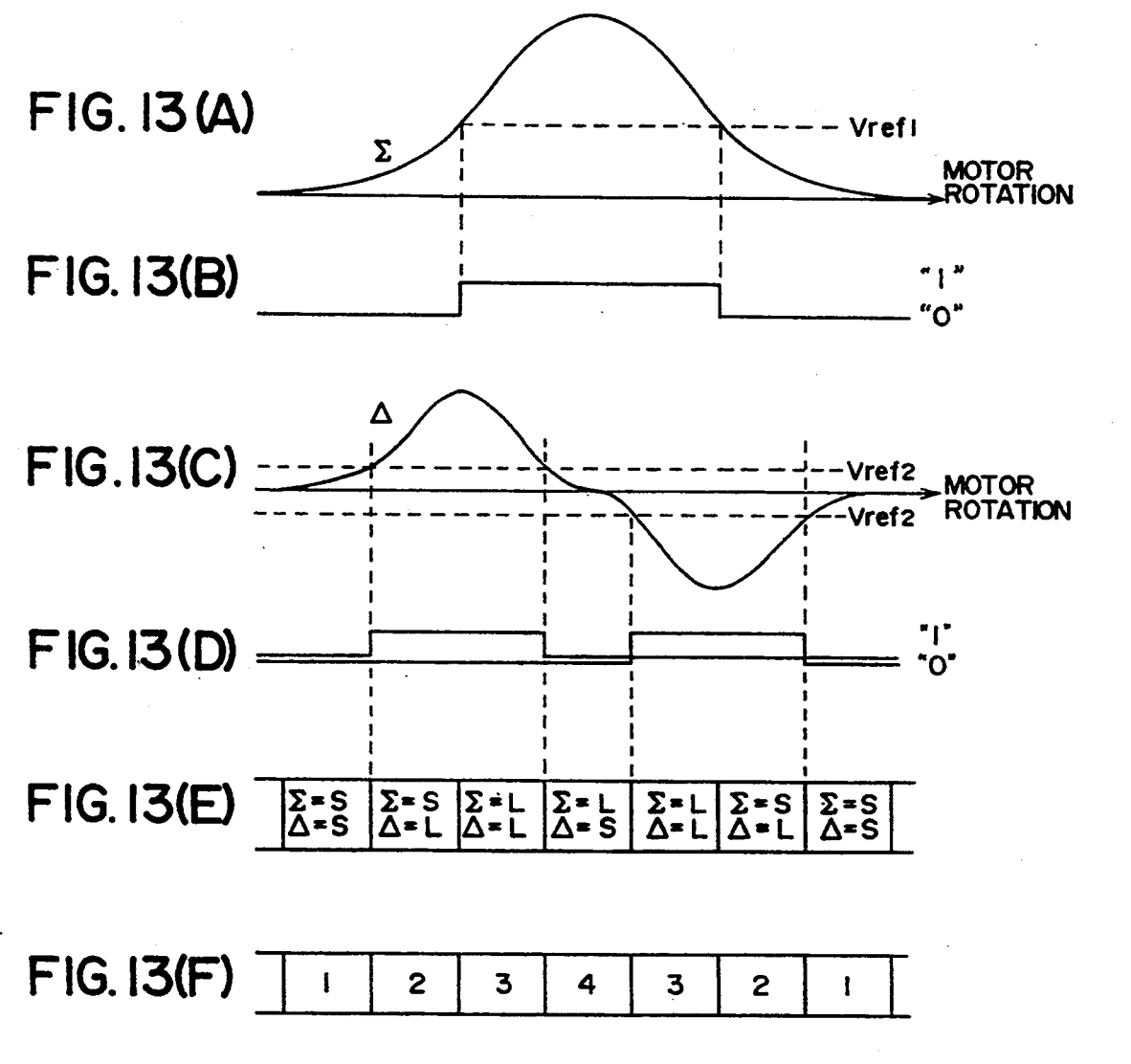

In order to implement such a control operation of the motor 31 according to the modes (1)–(4), a threshold process of FIGS. 13(A) and 13(C) may be employed wherein the discrimination of the foregoing modes (1)–(4) is achieved based upon a threshold $V_{ref1}$ defined with respect to the sum Σ and a threshold $V_{ref2}$ defined with respect to the difference Δ. The threshold $V_{ref1}$ is set such that the sum Σ has a level above $V_{ref}$ in correspondence to the state that the lens system is in the focusing position. Further, the threshold $V_{ref2}$ is set such that the difference Δ has a level above $V_{ref2}$ when the lens system is moving rapidly for seeking the proper focusing position, in correspondence to the situation described above.

Thus, when the signal indicative of the sum Σ of FIG. 13(A) exceeds the foregoing threshold $V_{ref1}$, a logic signal having a logic value "1" is produced as indicated in FIG. 13(B). On the other hand, when the signal indicative of the difference Δ of FIG. 13(C) exceeds the foregoing threshold $V_{ref2}$ in any one of the positive and negative directions, a logic signal having a logic value "1" is produced as indicated in FIG. 13(D), wherein the signals of FIGS. 13(B) and 13(D) are produced inside the logic circuit 47. Based upon the combination of the logic signals of FIGS. 13(B) and 13(D), the driving of the motor 31 is performed as will be described in detail below.

The lens drive controller 30 of FIG. 1 produces an output signal in response to the logic operation in the logic circuit 47 of FIG. 7 and drives the motor 31 via the output amplifier 34 such that focusing is achieved. When the lens system 11 almost in a state wherein a proper focusing is achieved, the proportion of the high frequency components increases in the output of the infrared camera unit 10 and the output voltage of the high pass filter 41 increases accordingly. Thus, the lens drive controller 30 determines the discrimination of the focusing state and the drives the motor 31 repeatedly until the difference Δ becomes zero.

Next, the operation of the control loop (2) of FIG. 1 will be described.

When a specified target approaches or moves away at a high speed with respect to the infrared imaging system, it will be noted that it is necessary to quickly move the lens system 11 in response to the control operation by the lens drive controller 30. However, there can be a case wherein the control by the loop (1) alone is not sufficient for achieving the necessary focusing. In order to handle such a case, the infrared imaging system of the present invention activates the motor 31 in advance according to a predictive control performed in the control system 32. By doing so, the infrared imaging system can adapt itself to keep the targets moving at a high speed to be properly focused.

In the predictive control achieved in the control system 32, the target position in the future is predicted, based upon the present position and the position in the past, for each predictive processing interval, which interval being defined as a multiple of the vertical synchronizing interval in a frame.

The positional information of the lens system 11 that corresponds to the distance to the target is detected by an encoder 35 provided on the motor 31, the encoder 35 detecting the rotation of the motor 31. The predictive control system 32 may achieve a linear prediction, wherein a relative speed V is obtained based upon the positional difference ΔL between the position in the past and the position at the present, as well as based upon the foregoing processing interval ΔT that corresponds to the time difference between the present and the past, according to the relationship V=ΔL/ΔT. Thereby, the future position L(t) is predicted according to the relationship $$L(t) = Vt + Lc,$$

where t represents the time and Lc represents the present position.

By driving the motor 31 in correspondence to the predicted future position L(t), one can achieve the predictive control of the lens system 11.

Figure 8:
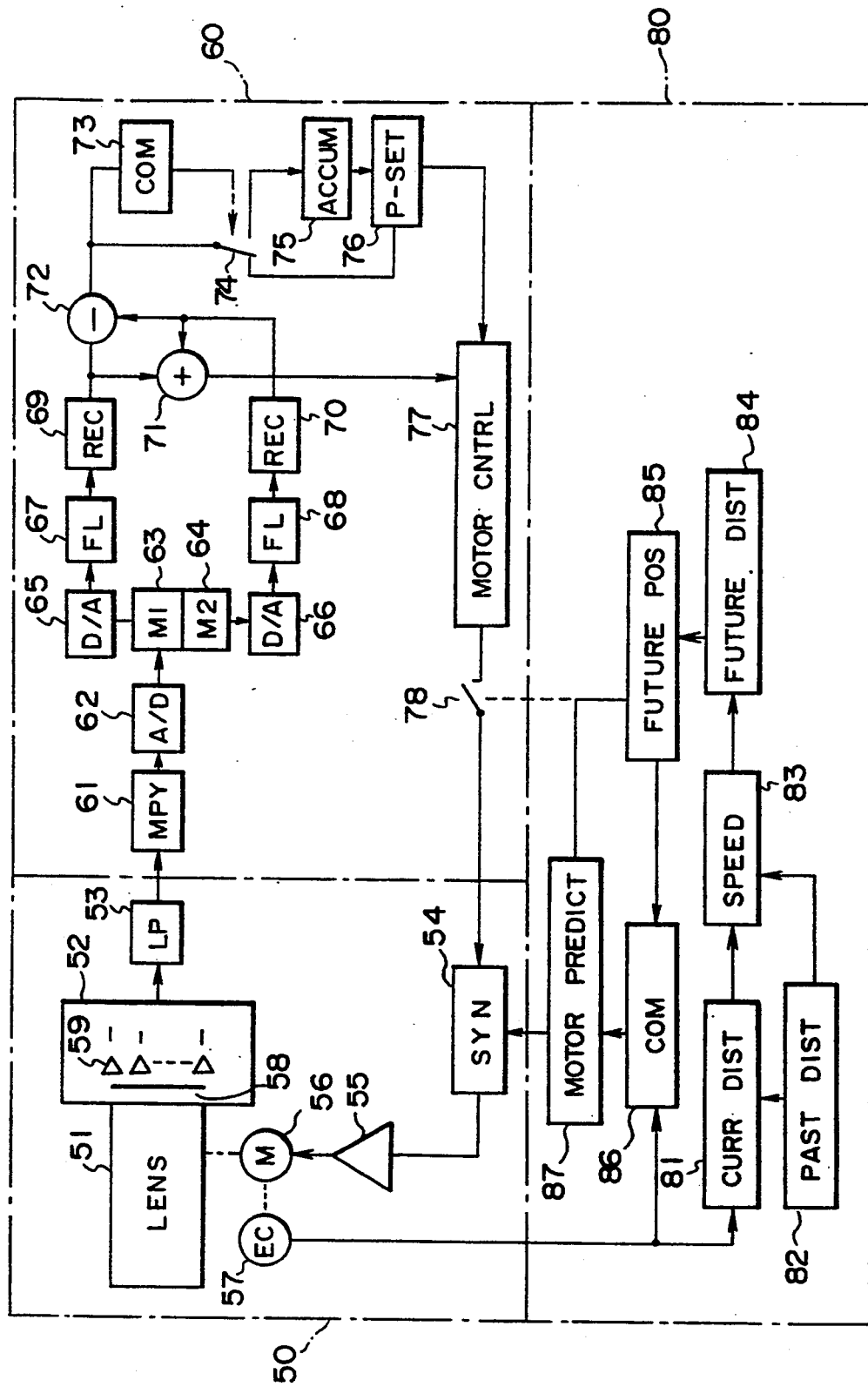
FIG. 8 is a block diagram showing the overall construction of the infrared imaging system according to another embodiment of the present invention.

FIG. 8 shows another embodiment of the infrared imaging system of the present invention, the system of FIG. 8 including a camera unit 50 for acquiring images, a first control loop unit 60 for achieving an automatic focusing control, and a second control loop unit 80 for achieving a predictive focusing control.

Referring to FIG. 8, the camera unit 50 includes a lens system 51 for projecting an image of the target and an optoelectric conversion unit 52 for converting the infrared image formed by the lens system 51 to an electric signal. The optoelectric conversion unit 52 produces an electrical output which is sent to a low pass filter 53 for noise elimination, while the lens system 51 performs focusing control in response to an output of a synthetic unit 54 that synthesizes the output of the control loop unit 60 and the output of the control loop unit 61. The output of the unit 54 is supplied to a drive motor 56 that moves the lens system 51 to perform focusing control, via a power amplifier 56. Further, there is provided an encoder 57 on the motor 56 for detecting the position of the lens system 51. In addition, the optoelectric conversion unit 52 includes an infrared detection array 58 for detecting the two-dimensional infrared image projected by the lens system 51 and a number of amplifiers 59 provided to correspond respectively to detection elements in the array 58, the amplifiers amplifying an electrical signal produced by the detection elements.

The control loop unit 60 includes a multiplexer 61, which receives the output of the detection elements in the array 58 via the low pass filter 53, for multiplexing the image output signals of the conversion unit 52 and further for extracting the image signal corresponding to the specified location of the view field. The output of the multiplexer 61 is converted to a digital signal in an A/D converter 62 and supplied to a line memory 63 that stores the present digital image signal for one selected line that is extracted in the multiplexer 61. Further, there is provided another line memory 64 for storing the digital image signal of the same line as the signal stored in the memory 63 but corresponding to one field before.

The outputs of the memories 61 and 63 are converted to analog signals in D/A converters 65 and 66, respectively, and the analog image signals thus produced are supplied to high-pass filters 67 and 68 for enhancing the high frequency components. The image signals thus processed at the filters 67 and 68 are supplied to rectifiers 69 and 70 which rectify the analog image signals supplied thereto.

The outputs of the rectifiers 69 and 70 are supplied to an adder circuit 71 for adding the outputs of the filters 67 and 68. Simultaneously, the outputs of the rectifiers 69 and 70 are supplied to a subtracter circuit 72 that subtracts the output of the filter 67 from the output of the filter 68. The output of the subtracter circuit 72 is supplied to a comparator circuit 73 that detects the minimum in the output of the subtracter circuit 72 and controls the switching circuit 107 of FIG. 11 in response to the result of the detection. The output of the subtracter circuit 72 is then supplied to an accumulation circuit 75 for each processing interval, wherein the circuit 75 accumulates the outputs supplied thereto. Further, there is provided a polarity detection circuit 76 that is supplied with the output of either of the subtracter circuit 72 and the accumulation circuit 75, wherein the circuit 76 produces an output signal indicative of the polarity of the signal supplied thereto.

Figure 12:
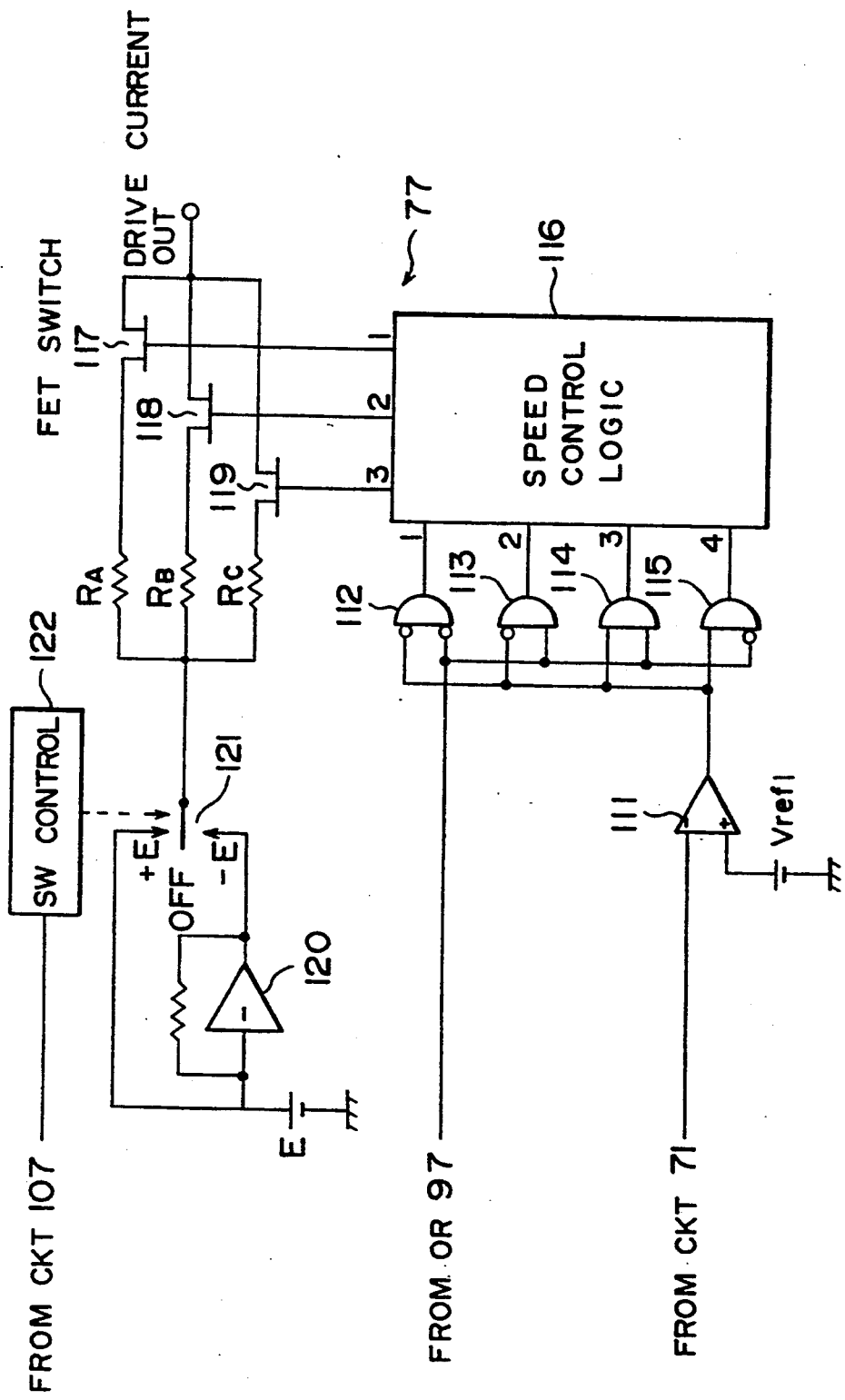
FIG. 12 is a circuit diagram showing another part of the imaging system of FIG. 8.

In response to the output of the adder circuit 71 that indicates the sum of the outputs of the filters 67 and 68 as well as in response to the output of the comparator circuit 73 that indicates the detection of the minimum in the difference signal produced in the subtracter 72, a motor control circuit 77 produces a control signal that controls the rotational speed of the motor 56 that drives the lens system 51, Thereby, the circuit 77 produces also another control signal for controlling the direction of rotation of the motor 56, The output of the control circuit 77 may be supplied to the motor 56 via a switching circuit 78 that interrupts the output of the motor control circuit 77, It should be noted that the switching circuit 78 may be replaced by FET switches 117–119 to be described later with reference to FIG. 12.

The control loop unit 80 includes a memory 81 for holding the data indicative of the present distance of the target from the camera, based upon the output of the encoder 57 that is attached to the lens system 51, Further, there is provided another memory 82 for holding the data indicative of the distance to the target for one processing interval before the current processing interval, wherein one processing interval includes one or more frames, Based upon the distance data thus held in the memories 81 and 82, the moving speed of the target is calculated in a speed calculation unit 83 that calculates the speed by dividing the distance the target has moved by the time which has elapsed before and after the movement of the target.

The data indicative of the speed of the target obtained in the unit 83 is supplied to a distance prediction unit 84 that predicts the change of the distance to the target in the next processing interval, Further, based upon the change of the distance obtained in the prediction unit 84, the future position of the lens system 51 is calculated at a position prediction unit 85, The data indicative of the future position of the lens system 51 is supplied to a prediction command circuit 86 that produces the prediction control output for controlling the lens system 51, based upon the information with regard to the current position of the lens system from the encoder 57 and the future position of the lens system from the position prediction unit 85, The output of the command circuit 86 is supplied to a predictive driving circuit 87 that produces a drive control signal for controlling the rotational speed of the motor 56, based upon the output of the command circuit 86. The output of the circuit 87 is supplied to the synthersis unit 54, which is further supplied with an output of the motor rotation control circuit 77, wherein the unit 54 synthesizes the output of the circuit 87 and the output of the circuit 77 to produce a control output that drives the motor 56 after being amplified in the power amplifier 55, When the predictive control alone is to be employed, the switching circuit 78 disconnects the motor control circuit 77 and the motor 56 is driven solely in response to the predictive output supplied from the predictive control circuit 87, FIGS. 9(A) and 9(B) show the selection of the target to be focused in the construction of FIG. 8, wherein FIG. 9(A) shows the selective reading of an image memory 90 while FIG. 9(B) shows the area of an infrared image that has been selected in the process of FIG. 9(A), In FIG. 9(A), the memory 90 stores images for one horizontal scanning line, the image being read from the memory 90 via a virtual switch or address counter 91.

Figure 9:
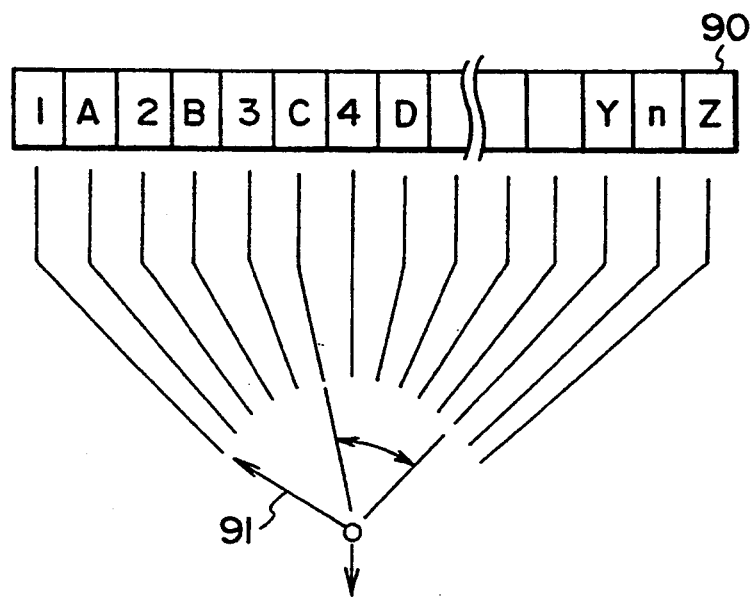
FIG. 9(A) is a diagram showing a selective reading of an image memory of the system of FIG. 8.
FIG. 9(B) shows the selected area of the view field in which the focusing should be achieved.
Figure 9B:
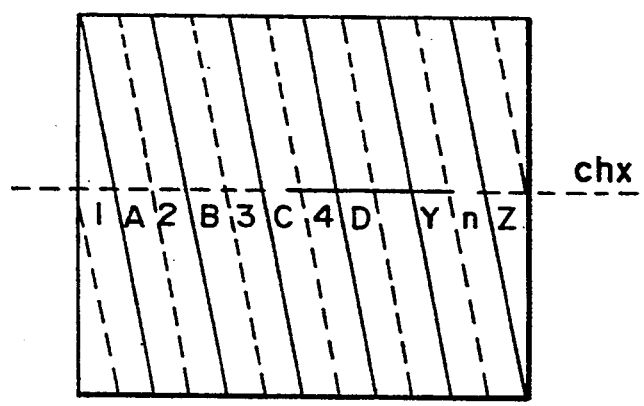

The memory 90, which corresponds to the memory 63 or 64 of FIG. 8, stores the image data for an arbitrary horizontal scanning line such as the horizontal scanning line corresponding to the channel $ch_x$ shown in FIG. 2(A), In response to the first scanning represented in FIG. 2(B) by the continuous lines, the memory 90 stores therein data 1, 2, 3, . . . as indicated in FIG. 9(A), Further, in response to the second scanning represented in FIG. 2(B) by the broken lines, the memory 90 stores therein data A, B, C, . . .

When data is being read from the memory 90, the address of the memory is specified by the switch 91 such that a desired range of data, such as the data C, 4, . . . , is read out. As a result of this, an image corresponding to a part of the horizontal scanning line for the channel $ch_x$ is specified as indicated in FIG. 9(B). The focusing process is thereby achieved with respect to the part of the image thus specified.

Referring to FIG. 8 again, it should be noted that the comparator circuit 73 produces a logic output "1" when the output of the subtracting circuit 72, indicative of the difference between the content of the memory 63 for the present moment and the content of the memory 64 for the past, has exceeded a minute threshold level. Thereby, the output of the subtracting circuit 72 itself is used for the discrimination of the polarity. On the other hand, when the output of the subtracting circuit 72 has decreased below the minute threshold level, the comparator circuit 73 produces a logic output "0". In this case, the accumulator 75 accumulates the above mentioned difference and outputs the result of the accumulation each time the content of the memory 90 for the one horizontal scanning line is updated.

Figure 10A:
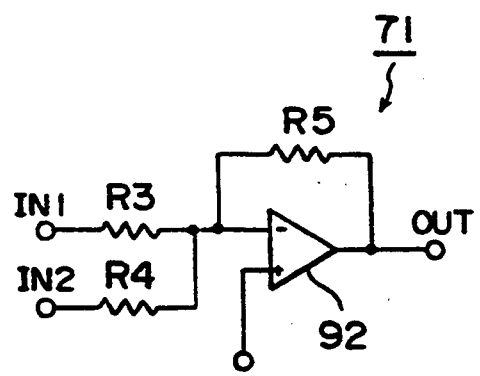
FIG. 10(A) is a circuit diagram of an addition circuit used in the system of FIG. 8.
Figure 10B:
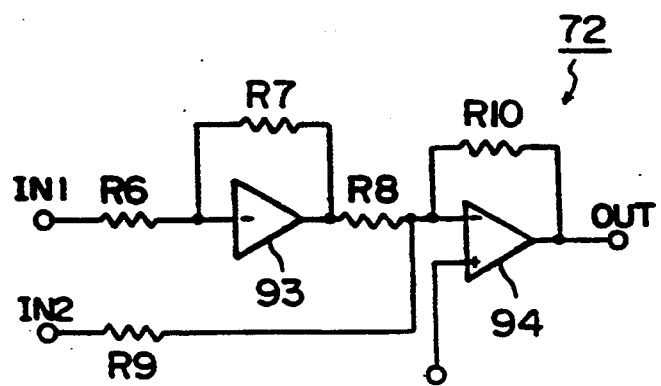
FIG. 10(B) is a circuit diagram of a subtracter circuit of the system of FIG. 8.

FIGS. 10(A) and 10(B) show an example of the subtracter circuit 72 and the adder circuit 71, wherein FIG. 10(A) shows the adder circuit 71 while FIG. 10(B) shows the subtracter circuit 72. It will be noted that the adder circuit 71 includes resistors $R_3$, $R_4$ and $R_5$, and an operational amplifier 92. On the other hand, the subtracter circuit 72 includes resistors $R_6$, $R_7$, $R_8$, $R_9$ and R10 as well as an inverter 93 and an operational amplifier 94.

FIG. 11 shows an example of the comparator circuit 73, the accumulation circuit 75 and the polarity discrimination circuit 76, wherein the comparator circuit 73 includes analog comparators 95 and 96 each forming a window comparator. In the circuit 73, it should be noted that the difference signal Δ is supplied to the analog comparators 95 and 96 having mutually opposite polarities, wherein the difference signal Δ is compared with the minute threshold voltage $V_{ref2}$. The outputs of the analog comparators 95 and 96 are then supplied to an OR gate 97 that produces a logic output "1" whenever the absolute value of the difference signal Δ has exceeded the threshold $V_{ref2}$. Further, there is provided an AND gate 98 that produces a logic output "1" when the absolute value of the difference signal Δ is smaller than the threshold $V_{ref2}$.

The accumulation circuit 75 includes an A/D converter 101 that produces an output digital signal corresponding to the foregoing difference signal The output digital signal of the accumulation circuit 75 is supplied to a memory 102 that is used for accumulating the difference signal ΔV in response to the start signal from the comparator circuit 73. It should be noted that the difference signal ΔV changes in each frame. Further, there is provided an adder circuit 103 that produces a signal C which is the sum of the content stored in the memory 102 and the output of the A/D converter 101. The accumulation circuit 75 starts the operation in response to the transition of the output of the AND gate 98 to the logic value "1," the circuit 75 being cleared in response to a clear signal from the polarity discrimination circuit 76.

The polarity discrimination circuit 76 includes an analog comparator 105 that produces a logic signal "1" or "0" based upon the discrimination of the polarity of the difference signal Δ. Further, the circuit 76 includes a digital window comparator 106 that discriminates a digital polarity with respect to the output of the accumulator 75. Thereby, the comparator circuit 106 produces a logic signal "1" or "0" in response to the result of the polarity discrimination and further produces the foregoing clear signal for clearing the accumulator 75 when the accumulated output exceeds a predetermined level. The output of the analog comparator 105 and the output of the digital comparator 106 are supplied to a switching circuit 107 that selects one of the outputs in response to the output of the AND gate 98. Thereby, an output signal indicative of the result of the polarity discrimination of the difference signal Δ is obtained.

FIG. 12 shows an embodiment of the motor control circuit 77.

Referring to FIG. 12, the motor control circuit 77 includes an analog comparator 111 that produces an output signal "1" or "0" based upon the relationship between the sum signal Σ and the threshold voltage $V_{ref1}$. The output of the analog comparator 111 is supplied to a status discrimination circuit, which is formed of AND gates 112–115, together with the logic output of the analog comparator 111. Thereby, the AND gates 112–115 produce an output signal indicative of any one of the following four modes as follows.

TABLE I

|  | Σ | Δ |
| --- | --- | --- |
| MODE (1) | SMALL | SMALL |
| MODE (2) | SMALL | LARGE |

TABLE I-continued

|  | Σ | Δ |
| --- | --- | --- |
| MODE (3) | LARGE | LARGE |
| MODE (4) | LARGE | SMALL |

FIGS. 13(A)–13(F) show the relationship between the addition signal Σ and the difference signal Δ, wherein FIG. 13(A) shows the addition signal Σ and FIG. 13(B) shows a quantized logic signal corresponding to the addition signal Σ. Similarly, the signal of FIG. 13(C) represents the difference signal Δ while the signal of FIG. 13(D) represents a quantized logic signal corresponding to the difference signal Δ. Further, FIG. 13(E) shows the combination of the signals Σ and Δ, and FIG. 13(F) shows the output indicative of the mode shown in TABLE I.

It should be noted that the quantized output of FIG. 13(B) is obtained by applying a threshold process to the addition signal Σ of FIG. 13(A) having a threshold level of $V_{ref1}$. On the other hand, the quantized output of FIG. 13(D) is obtained by applying a threshold process to the difference signal Δ of FIG. 13(C) having the threshold level $V_{ref2}$. It should be noted that the combination of the signals Σ and Δ of FIG. 13(E) represents one of the foregoing modes (1)–(4) and the signal of FIG. 13(F) represents one such mode represented by the combination of the signal Σ and Δ of FIG. 13(E).

Referring to FIG. 12 again, the status signals of FIG. 13(F) are supplied to a speed control logic 116, wherein the speed control logic 116 produces control signals (1)–(3) of the motor 56 as follows.

TABLE II

| mode | control output | energization status |
| --- | --- | --- |
| (a) (1) | (1) | high speed |
| (b) (2) | (2) | medium speed |
| (c) (3) | (2) | low or medium speed |
| (d) (4) | (3) | low or very low speed |

As a result of performing focusing control according to the foregoing modes (1)–(4) of the output of the speed control logic 116, the motor 56 is driven in four distinct modes (a)–(d). In addition, there may be a fifth mode (e) wherein the energization of the motor 56 is interrupted. Further, it is possible to control the energization of the motor 56 in eight or more steps by incorporating intermediate driving speeds.

The actual energization of the motor 56 is achieved by supplying a driving voltage E of the motor 56 and an inversion (−E) of the voltage E to a switch 121 that is activated in response to the output of a switching controller 122, wherein the switching controller 122 is driven in response to the polarity signal supplied from the switching circuit 107. As a result of the activation of the switch 121, a drive power voltage having a magnitude of +E or −E is supplied selectively to the motor 56. Further, the switch 121 assumes an intermediate position designated as OFF in FIG. 12 when the direction of rotation of the motor 56 is going to be reversed. In response to the switch 121 being in the OFF position, the supplying of electric power to the motor 56 is interrupted. Further, although not illustrated, one may supply the control signals (1)–(3) of the speed control logic 116 to the switching controller 122 so that the time during which the supplying of the power to the motor 56 is interrupted is lengthened in correspondence to the rotational speed of the motor 56.

The electric power thus produced is supplied to the motor 56 via the FET switches 117–119, wherein resistors $R_A$, $R_B$ and $R_C$ ($R_A < R_B < R_C$) are connected in series to the FET switches 117–119 such that the drive current of the motor 56 produced has a magnitude that changes in eight steps in correspondence to the control signals (1)–(3).

According to the present invention having such a construction, the rotational energy of the motor 56 caused by the inertia of the motor is absorbed before the motor 56 starts to rotate in the reverse direction. Thus, the effect of a shock applied to the lens system 51 when the rotational direction of the motor is being reversed is successfully minimized.

Figure 14:
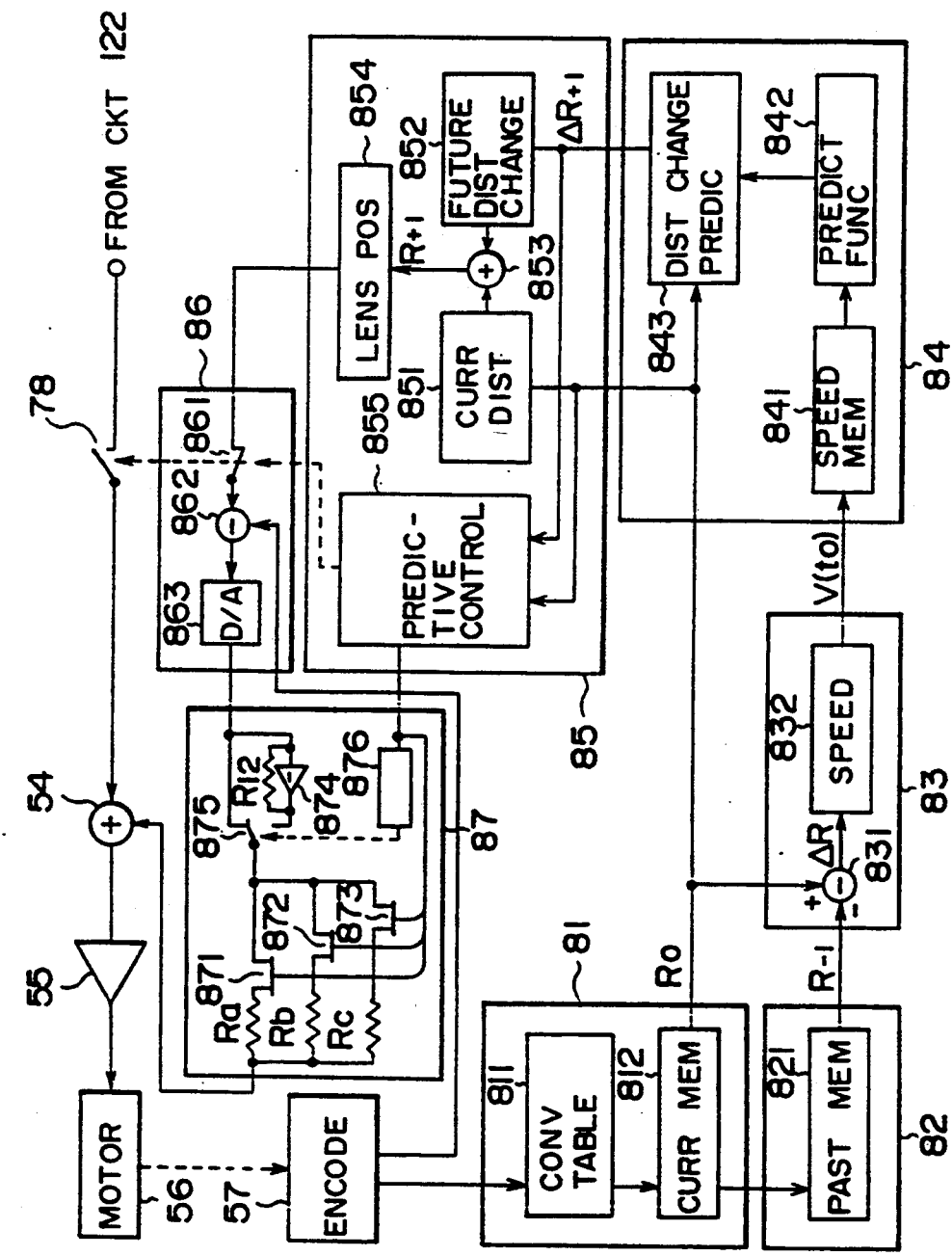
FIG. 14 is a block diagram showing the construction of a predictive control unit used in the system of FIG. 8.

FIG. 14 shows in detail an embodiment of the control loop unit 80 of FIG. 8 in detail, wherein those parts shown in FIG. 8 are designated by the same reference numerals as in FIG. 8.

Referring to FIG. 14, the memory 81 includes a conversion table 811 for converting the lens position data supplied from the encoder 57 to the distance data. Further, the memory 81 includes a memory device 812 for storing the current distance $R_0$ of the target corresponding to the current processing interval. In addition, the memory 82 includes a memory device 821 for storing past distance $R_{-1}$ that has been stored in the memory device 812 in the previous processing interval.

The speed calculation unit 83 includes a subtracter 831 that calculates the difference between the past distance $R_{-1}$ and the current distance $R_0$ as $\Delta R$. Further, the unit 83 includes a speed calculation unit 832 that calculates the moving speed of the target from the distance difference $\Delta R$ ($=R_0-R_{-1}$) and the processing interval $\Delta T$ as $v(t_0)$ ($=\Delta R/\Delta T$).

The moving speed thus obtained at the unit 83 is supplied to a speed memory 841 of the speed prediction unit 84, wherein the memory 841 stores therein the moving speed of the target in the past as $v(t_0)$, $v(t-1)$, $v(t-2)$, $v(t-3)$ ... Based upon these moving speeds of the past stored in the memory 841, a prediction function generator in the unit 84 generates a function that predicts the future moving speed of the target. Further, based upon the predicted speed of the target, a distance prediction calculator 843 in the unit 84 calculates the future distance change $\Delta R_{+1}$ for the future processing interval.

The position prediction unit 85 includes a register 851 for the current target position and a register 852 for the future target position, wherein the register 851 holds the current distance $R_0$ of the target supplied from the memory 81. Further, the register 852 holds the future distance change $\Delta R_{+1}$ supplied from the unit 84. Thereby, the current distance $R_0$ and the future distance change $\Delta R_{+1}$ are added together in an addition node 853, wherein the future position of the target for the next processing interval is obtained in the node 853.

The future position of the target obtained in the node 853 is then supplied to a lens position calculation unit 854, wherein the unit 854 calculates the future lens position based upon the predicted future target distance $R_{+1}$ for the next processing interval. Further, the unit 85 includes a predictive control decision unit 855 that activates the predictive control of the control loop unit 80 when the future distance change $\Delta R_{+1}$ has a magnitude indicative of the fact that the control by the control loop unit 60 is insufficient. More specifically, the decision unit 855 activates the switch 78 and the command circuit 86 to control a switch 861 provided in the circuit 86. Further, the unit 855 produces a speed control signal which is sent to the predictive control unit 87 in response to the present target distance $R_0$ and the future distance change $\Delta R_{+1}$. It should be noted that the units 81–85 can be constructed by software.

The prediction command circuit 86 includes a switch 861 that cooperates with the switch 78. When the predictive control is activated, the switch 861 is turned on and the switch 78 is turned off to conduct the predictive control. The circuit 86 further includes a subtracter 862 that subtracts the data for the present lens position, which has been supplied from the encoder 57, from the future positional data of the lens system supplied from the unit 85. Further, there is provided a D/A converter 863 that converts the output of the subtracter 862 to an analog signal indicative of the distance the lens system 51 has moved. It should be noted that the switch 78 is turned on and the switch 861 is turned off when the predictive control is not employed. Thereby, the control by the control loop in the unit 60 is achieved while the control by the unit 80 is deactivated.

The predictive control unit 87 includes FET switches 871–873 that form, together with resistors $R_a$, $R_b$ and $R_c$ ($R_a < R_b < R_c$), a part of the motor control voltage generator, wherein the FET switches 871–873 produce a drive current of the motor 56 such that the drive current changes, in response to the speed control signal from the predictive control decision unit 855, in eight steps. The output drive current thus produced is supplied to the synthesis unit 54.

The voltage signal obtained by converting the output of the subtracter 862 by the D/A converter 863 as well as the voltage signal obtained by inverting the output of the D/A converter 863, are supplied to a switch 875, wherein the switch 875 selects one of the voltage signals thus supplied thereto in response to a signal indicative of the polarity and supplied from the predictive control decision unit 855, and supplies the selected one of the voltage signals to the FET switches 871–873 to produce the control voltage of the motor 56. Similarly to the control performed by the motor control circuit 77 of FIG. 12, one may control the motor to stop it for a moment when the driving direction of the motor is going to be changed, by holding the switch 875 at an intermediate, disconnecting position. In such a procedure, it is preferable to change the duration in which the motor is held stationary, in response to the rotational speed of the motor such that the stationary duration of the motor increases when the rotational speed of the motor is high.

It should be noted that one can achieve a quick tracking control of the automatic focusing system for fast moving targets by alternately activating the control loop unit 60 and the control loop unit 80. In such a case, the prediction of the future position of the lens system can be made continuously, and once the predicted distance change is too large for the control loop unit 60, the command circuit 86 activates the switch 861. In response to this, the control loop unit 80 is activated and the motor 56 is driven to a predicted future position. In this state, the switch 78 is turned off so as to disconnect the control loop unit 60, and the operation of the unit 80 is conducted preferentially. After the foregoing control is achieved, the control loop unit 60 is activated again.

Figure 15:
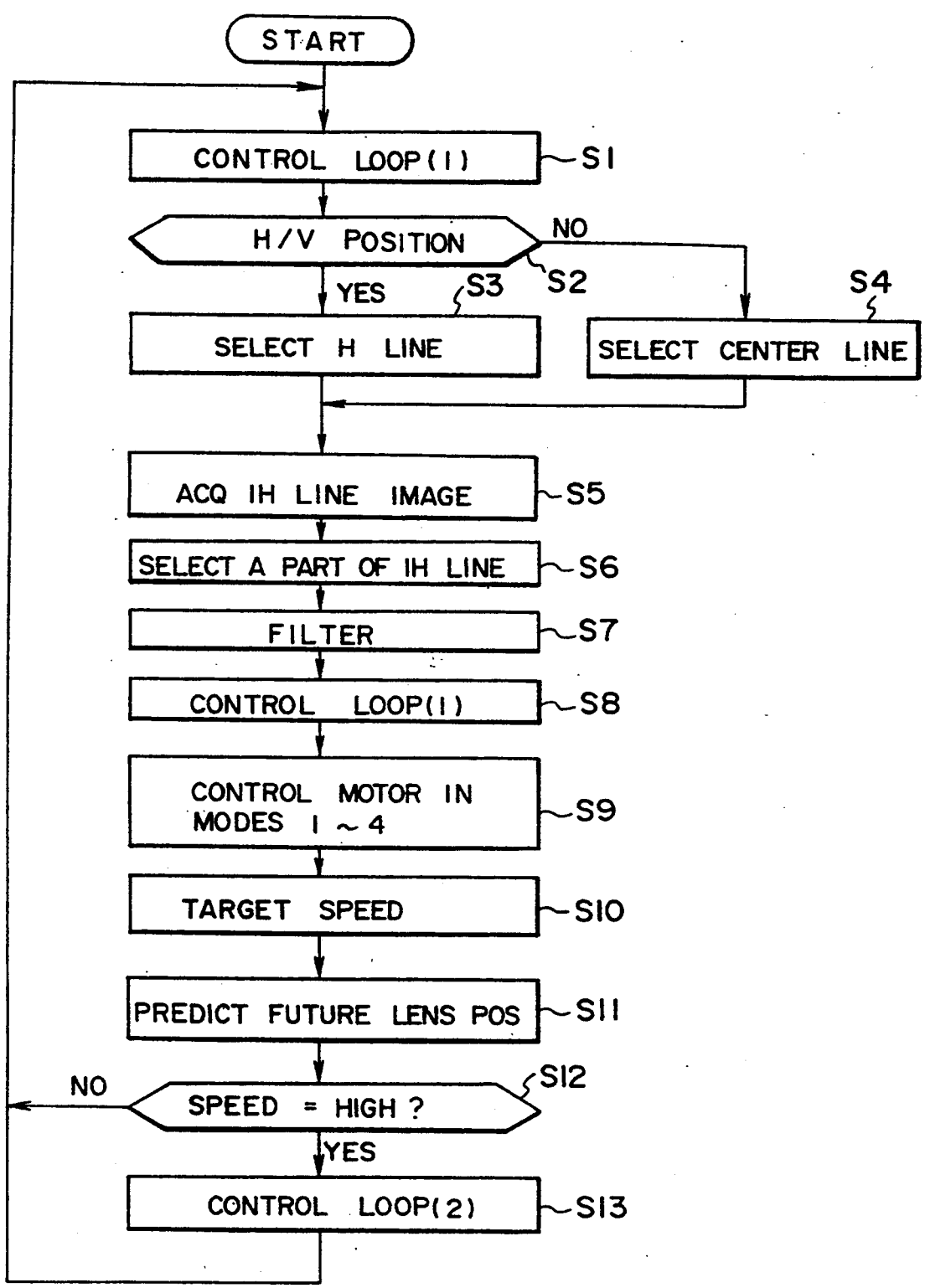
FIG. 15 is a flowchart showing the process steps conducted in the infrared imaging system of the present invention.

FIG. 15 represents a flowchart of the automatic focusing control employed in the infrared imaging system of the present invention.

Referring to FIG. 15, a step S1 is conducted at first to activate the control loop unit 60. In a step S2, it is checked whether the operator has specified specific vertical and horizontal positions for the images in the view field, and if YES, a step 83 is conducted wherein a vertical scanning line, and hence the infrared detection element corresponding to such a vertical scanning line, are selected. When there is no specific instruction, on the other hand, a step S4 is conducted wherein the horizontal scanning line at the center of the view field is selected.

Next, image data for the specified horizontal scanning line is obtained in a step S5, and an image signal corresponding to an arbitrary range of the horizontal scanning line is extracted in a step S6. Further, a filtering process is performed in a step S7, and a step S8 is conducted to detect the state of the automatic focusing system based upon the foregoing modes (1)–(4). Further, in a step S9, the motor is driven at a speed corresponding to the detected mode.

Next, the moving speed of the target is detected in a step S10 based upon the change of the lens position, and the future position of the lens system is predicted in a step S11 based upon a predicted distance change that is evaluated by creating a prediction function. Further, in a step S12, a determination is made whether or not the moving speed of the target is large, and if YES, a step S13 is conducted such that the control loop unit 60 is disconnected and the focusing control is achieved solely by the control loop unit 80. When the control process is done, the control loop unit 60 is again activated.

In the foregoing various embodiments, one may replace the analog operational circuits and filters with digital circuits.

Further, the present invention is not limited to the embodiments described heretofore, but various variations and modifications may be made without departing from the scope of the invention.

What is claimed is:

1. An infrared imaging system comprising:
a lens system for focusing a two-dimensional infrared image of an object on an image plane of said lens system;
a lens drive mechanism carrying said lens system such that said lens system is movable along an optical axis of said lens system:
an infrared detection array comprising a plurality of infrared detection elements arranged on a plane, for producing output signals indicative of said two-dimensional image of said object;
display means supplied with said output signals from said infrared detection array for displaying an image of said object;
filtering means supplied with said output signals from said infrared detection array for extracting high spatial frequency components therefrom;
processing means supplied with an output of said filtering means indicative of said high spatial frequency components, said processing means evaluating a rate of change of said output of said filtering means with time and producing a control signal indicative of a focusing state of said infrared image on said infrared detection array, based upon said rate of change thus evaluated;
said processing means supplying said control signal to said lens drive mechanism for controlling the same such that said image plane coincides substantially with said plane of said infrared detection array;
said processing means comprising a first memory for storing said output signals of said filtering means corresponding to one horizontal scanning line that is included in said two-dimensional image for the present moment, a second memory for storing said output signals of said filtering means corresponding to said horizontal scanning line for a moment in the past, an adder for calculating a sum of a content of said first memory and a content of said second memory, a subtracter for calculating a difference between said content of said first memory and said content of said second memory, and a logic circuit supplied with an output of said adder and an output of said subtracter for producing said control signal indicative of said focusing state based upon a combination of said output of said adder and said output of said subtracter.

2. An infrared imaging system as claimed in claim 1, wherein said filtering means comprises a low pass filter having a sharp cutoff characteristic for eliminating noise from said output signals of said infrared detection array and a frequency discrimination filter for receiving an output of said low pass filter, said frequency discrimination filter having a characteristic that gently enhances high frequency components in said output of said low pass filter.

3. An infrared imaging system as claimed in claim 2, wherein said frequency discrimination filter has a low cutoff characteristic for cutting off low frequency components.

4. An infrared imaging system as claimed in claim 3, wherein said frequency discrimination filter comprises either of a high pass filter and a band pass filter.

5. An infrared imaging system as claimed in claim 1, wherein said infrared imaging system comprises image selection means for selecting a horizontal scanning line that is to be written into said first and second memories in correspondence to a position in a view field of said display means.

6. An infrared imaging system as claimed in claim 1, wherein said logic circuit drives said lens drive mechanism such that said drive mechanism is driven at a high speed when said output of said adder is at a low level below a first threshold and said output of said subtracter is at a low level below a second threshold, such that said drive mechanism is driven at an intermediate speed when said output of said adder is at a low level below said first threshold and said output of said subtracter is at a high level above said second threshold, such that said drive mechanism is driven at an intermediate speed when said output of said adder is at a high level above said first threshold and said output of said subtracter is at a high level above said second threshold, and such that said lens drive mechanism is driven at a low speed when said output of said adder is at a high level above said first threshold and said output of said subtracter is at a low level below said second threshold.

7. An infrared imaging system as claimed in claim 6, wherein said logic circuit drives said lens drive mechanism such that said lens drive mechanism is driven at a low speed when said output of said adder is at a high level above said first threshold and said output of said subtracter is at a high level above said second threshold and such that said lens drive mechanism is driven at a very slow speed when said output of said adder is at a high level above said first threshold and said output of said subtracter is at a low level below said second threshold.

8. An infrared imaging system as claimed in claim 6, wherein said logic circuit determine the direction in which said lens drive system is driven before said lens drive mechanism is driven.

9. An infrared imaging system as claimed in claim 8, wherein said logic circuit drives premonitorily said lens drive mechanism in a first direction for discriminating whether or not said output of said subtracter increases as said lens drive mechanism is driven in said first direction, said logic circuit driving said lens drive mechanism in said first direction when said output of said subtracter is positive and increases as a result of said premonitory driving of said lens drive mechanism in said first direction said logic circuit driving said lens drive mechanism in a second, opposite direction when said output of said subtracter is negative and increases with as a result of said premonitory driving of said lens drive mechanism in said first direction.

10. An infrared imaging system as claimed in claim 9, wherein said logic circuit determines the direction in which said lens drive mechanism is driven based upon an accumulation signal that is produced by accumulating said output of said subtracter while driving said lens drive mechanism premonitorily in said first direction.

11. An infrared imaging system as claimed in claim 9, wherein said control logic circuit stops said lens drive mechanism for a predetermined time period when the direction of driving of said lens drive mechanism is reversed, such that said predetermined time period is determined in response to a speed at what said lens drive mechanism is driven when said logic circuit has determined the direction in which said lens drive mechanism is driven.

12. An infrared imaging system as claimed in claim 1, wherein said lens drive mechanism comprises a drive motor for moving said lens system along said optical axis and an encoder provided on said drive motor for detecting a current position of said lens system with respect to said infrared detection array; said infrared imaging system further comprising second processing means; said second processing means comprising:
   current distance holding means supplied with an output of said encoder indicative of said position of said lens system for the present moment, for obtaining a current distance of said object from said position of said lens system, said current distance holding means holding said current distance therein;
   past distance holding means supplied with an output of said encoder indicative of said position of said lens system for a past moment, for obtaining a past distance of said object from said position of said lens system, said past distance holding means holding said past distance therein;
   speed calculation means supplied with data indicative of said current distance from said current distance holding means and data indicative of said past distance from said past distance holding means, for calculating a speed of said object;
   distance change evaluation means supplied with data indicative of said speed of said object from said speed calculation means consecutively for a plurality of times, for predicting a change of distance to said object for a future moment;
   future position evaluation means supplied with data indicative of said current distance from said current distance holding means and further with data indicative of said change of distance from said distance change evaluation means, for predicting a future position of said lens system;
   commanding means supplied with data indicative of said future position of said lens system from said future position evaluation means and further with data indicative of said current position of said lens system from said encoder, for evaluating a predicted distance which said lens system moves; and
   energization means supplied with a control signal, corresponding to said predicted distance which said lens system moves, from said commanding means, for driving said motor with a voltage that is determined in response to said predicted distance.

13. An infrared imaging system as claimed in claim 12, wherein said current distance holding means comprises a conversion table for converting said position of said lens system supplied from said encoder to said distance to said object.

14. An infrared imaging system as claimed in claim 12, wherein said speed calculation means comprises subtraction means for subtracting said past distance from said current distance to calculate a distance change and dividing means for dividing said calculated distance change by a time which has elapsed from said past moment to the present moment.

15. An infrared imaging system as claimed in claim 12, wherein said distance change evaluation means comprises speed memorizing means for holding said speed of said object for a plurality of past moments, prediction function generation means supplied with said speed of said object from said speed memorizing means for generating a prediction function indicative of a predicted future speed of said object, and distance change prediction means supplied with said predicted future speed of said object from said prediction function generation means for evaluating said change of distance to said object for a future moment.

16. An infrared imaging system as claimed in claim 12, wherein said future position evaluation means comprises adding means for evaluating a future distance to said object by adding said current distance and said change of distance evaluated in said distance change evaluation means, lens position evaluation means supplied with said future distance from said future position evaluation means for evaluating a future position of said lens system, and predictive control decision means supplied with said change of distance to said object and said current distance for deciding an activation of a predicted control process, said predictive control decision means outputting a switching control signal and a speed control signal when using said predicted control process.

17. An infrared imaging system as claimed in claim 16, wherein said commanding means comprises a switch that is turned on in response to said switching control signal from said predictive control decision means and a subtracter for evaluating said distance said lens system has moved by subtracting said current position of said lens system from said future position of said lens system.

18. An infrared imaging system as claimed in claim 16, wherein said energization means produces said voltage and supplies the same to said motor such that said voltage has a magnitude that is changed in a plurality of steps in response to said speed control signal from said prediction control decision means, said energization means further changing the polarity of said voltage in response to said speed control signal.

* * * * *